US008699837B2

(12) United States Patent
Baets et al.

(10) Patent No.: US 8,699,837 B2
(45) Date of Patent: Apr. 15, 2014

(54) METHOD AND SYSTEM FOR COUPLING RADIATION

(75) Inventors: Roel Baets, Deinze (BE); Diedrik Vermeulen, Sint-Pauwels (BE); Danaë Delbeke, Gentbrugge (BE); Elewout Hallynck, Wachtebeke (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 282 days.

(21) Appl. No.: 13/000,832

(22) PCT Filed: Jun. 23, 2009

(86) PCT No.: PCT/EP2009/057851
§ 371 (c)(1),
(2), (4) Date: Dec. 22, 2010

(87) PCT Pub. No.: WO2009/156412
PCT Pub. Date: Dec. 30, 2009

(65) Prior Publication Data
US 2011/0103743 A1 May 5, 2011

Related U.S. Application Data

(60) Provisional application No. 61/074,882, filed on Jun. 23, 2008.

(51) Int. Cl.
*G02B 6/34* (2006.01)
(52) U.S. Cl.
USPC .................................. 385/37; 385/88; 385/93

(58) Field of Classification Search
USPC ........ 385/37, 88–94; 372/23, 50, 96, 102, 25; 369/103, 112
See application file for complete search history.

(56) References Cited

U.S. PATENT DOCUMENTS

| 4,006,432 A | * | 2/1977 | Streifer et al. ................. 372/96 |
| 5,093,876 A | | 3/1992 | Henry et al. |
| 5,917,798 A | * | 6/1999 | Horimai et al. .............. 369/103 |
| 6,064,783 A | | 5/2000 | Congdon et al. |
| 6,134,208 A | * | 10/2000 | Taniguchi et al. ....... 369/112.19 |
| 6,236,782 B1 | * | 5/2001 | Kewitsch et al. .............. 385/43 |

(Continued)

FOREIGN PATENT DOCUMENTS

EP 1353200 10/2003

OTHER PUBLICATIONS

PCT International Application Search Report and Written Opinion, PCT International Application No. PCT/EP2009/057851 dated Sep. 28, 2009.

(Continued)

*Primary Examiner* — Ellen Kim
(74) *Attorney, Agent, or Firm* — McDonnell Boehnen Hulbert & Berghoff LLP

(57) ABSTRACT

The present invention relates to a coupler (100) for coupling radiation to one optical element. The coupler (100) comprises a splitter (110) for splitting a received radiation beam in at least two radiation sub-beams, at least two distinct sub-gratings (120a, 120b) adapted for directing radiation sub-beams such that all radiation is coupled out by the coupler into substantially one direction, and a means for guiding (130a, 130b) each of the radiation sub-beams between the splitter and a sub-grating (120a, 120b).

21 Claims, 5 Drawing Sheets

(56) References Cited

U.S. PATENT DOCUMENTS

| | | | |
|---|---|---|---|
| 6,477,294 B1* | 11/2002 | Van Doorn et al. | 385/24 |
| 6,714,575 B2* | 3/2004 | Evans | 372/50.1 |
| 7,184,386 B2* | 2/2007 | Nikolai et al. | 369/112.09 |
| 7,194,466 B2 | 3/2007 | Chen et al. | |
| 7,356,224 B2* | 4/2008 | Levner et al. | 385/37 |
| 7,450,624 B2* | 11/2008 | Evans et al. | 372/50.11 |
| 7,889,336 B2* | 2/2011 | Yankov | 356/328 |
| 2002/0146193 A1* | 10/2002 | Hamada | 385/15 |
| 2003/0235370 A1* | 12/2003 | Taillaert et al. | 385/50 |
| 2005/0018965 A1* | 1/2005 | Shen et al. | 385/37 |
| 2005/0046928 A1 | 3/2005 | Bischel et al. | |

OTHER PUBLICATIONS

Van Laere, F. et al., "Compact and Highly Efficient Grating Couplers Between Optical Fiber and Nanophotonic Waveguides", Journal of Lightwave Technology, vol. 25, No. 1, Jan. 2007, pp. 151-156.

* cited by examiner

METHOD AND SYSTEM FOR COUPLING RADIATION

CROSS-REFERENCE TO RELATED APPLICATIONS

The present application is a national stage application of International Patent Application no. PCT/EP2009/057851, which claims priority to U.S. Provisional Patent Application No. 61/074,882.

FIELD OF THE INVENTION

The present invention relates to the field of radiation coupling. More particularly, the present invention relates to methods and systems for efficiently coupling broadband radiation signals.

BACKGROUND OF THE INVENTION

Transferring radiation between a fiber and a second optical element, e.g. an optical circuit often is done by a grating coupler. In order to optimize the functionality of an optical system, one strives for a coupling efficiency that is as high as possible. The coupling efficiency of a grating coupler (e.g. to a fiber) is determined by the amount of power scattered by the grating and the overlap between the Gaussian fiber mode and the scattered power profile by the grating e.g. an exponentially decaying profile for a uniform grating.

The parameters such as e.g. etch depth, filling factor, number of periods N of standard grating couplers can be optimized in order to match the optimum for both criteria. This exercise results in an optimal coupling strength of the grating. The experimental coupling efficiency for standard 1-dimensional or 2-dimensional grating couplers in SOI is typically 30-40%, and the 1 dB optical bandwidth is typically 45 nm.

This optical bandwidth is mainly determined by the number of grating periods N (and therefore the length of the grating). Typically, the number of periods for an SOI-based grating is N=20, resulting in a grating length of the order of the dimensions of the fiber mode. One way to increase the optical bandwidth is by decreasing the number of periods of the grating. In that case, the coupling strength of the grating does not change but less power is scattered to the fiber, since there are less scattering elements. By increasing the coupling strength of the grating (e.g. through deeper etching), the amount of scattered power can be kept substantially identical, but the overlap between the scattered profile and the fiber mode may be very low, since the power is radiated over a too short length. Decreasing the number of periods will thus result in higher optical bandwidth but lower coupling efficiency.

SUMMARY OF THE INVENTION

It is an object of the present invention to provide efficient systems and methods for coupling radiation between two optical elements. It is an advantage of embodiments according to the present invention that an increased optical bandwidth for coupling radiation can be obtained without significantly reducing the coupling efficiency.

The above object is obtained using a method and/or system according to aspects of the present invention.

The present invention relates to a coupler for coupling radiation to one optical element, the coupler comprising a splitter for splitting a received radiation beam in at least two radiation sub-beams, at least two distinct sub-gratings adapted for directing radiation sub-beams such that all radiation is coupled out by the coupler into substantially one direction, and means for guiding each of the radiation sub-beams between the splitter and distinct sub-gratings. It is an advantage of embodiments according to the present invention that an increased bandwidth without significant reduction of coupling efficiency can be obtained using a combination of conventional components, resulting in a coupler that can be easily made.

The present invention also relates to a coupler for coupling radiation received from one optical element to an optical component, the coupler comprising at least two distinct sub-gratings adapted to all receive different radiation sub-beams from the radiation received from the optical element, a combiner for combining the at least two radiation sub-beams into one combined radiation beam, and means for guiding each of the radiation sub-beams between the at least two distinct sub-gratings and the combiner.

Directing radiation sub-beams such that all radiation is coupled out into substantially one direction may comprise directing such that all radiation may be coupled out to the one optical element.

The coupler may be a one dimensional grating coupler.

The coupler may be a two dimensional grating coupler.

The number of sub-gratings may be for example two or may be for example four.

Feeding of the sub-gratings or guiding away from the sub-gratings may be performed such that the angle between the feeding directions or guiding directions for the sub-gratings is substantially 2π/n, n being the number of sub-gratings.

The sum of the number of periods of the sub-gratings may be adapted to match the size of the one optical element in optical communication with the coupler.

A grating strength of the coupler may be adapted such that substantially no leakage between sub-gratings occurs.

A grating strength of the coupler may be adapted such that leakage between sub-gratings occurs.

Apodization of at least one of the sub-gratings may be performed for maximizing the overlap with a Gaussian fiber mode for an optical fiber in optical communication with the coupler.

A wedge may be provided on top of the grating, in order to diffract light that leaks between sub-gratings to an optical fiber in optical communication with the coupler.

The sub-gratings may be adapted to direct all sub-beams into substantially the same direction or to receive the sub-beams from substantially one and the same direction.

For one or more of the sub-gratings an additional wedge may be provided for redirecting the sub-beam such that outcoupling or incoupling can occur to or from one and the same direction.

The present invention also relates to a method for coupling radiation, the method comprising splitting a received radiation beam in at least two radiation sub-beams, guiding each of the generated radiation sub-beams towards a distinct sub-gratings, and directing all sub-beams by the distinct sub-gratings such that outcoupling of the radiation occurs in substantially one direction.

The present invention furthermore relates to a method for coupling radiation, the method comprising receiving a single radiation beam and directing a plurality of radiation sub-beams being part of the radiation beam into different directions using a set of distinct sub-gratings, guiding the different radiation sub-beams to a combiner, and combining the different sub-beams to a single combined radiation beam.

Particular and preferred aspects of the invention are set out in the accompanying independent and dependent claims. Features from the dependent claims may be combined with features of the independent claims and with features of other dependent claims as appropriate and not merely as explicitly set out in the claims.

Embodiments of the invention will now further be discussed in the detailed description in conjunction with the drawings. The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

Figure 1:
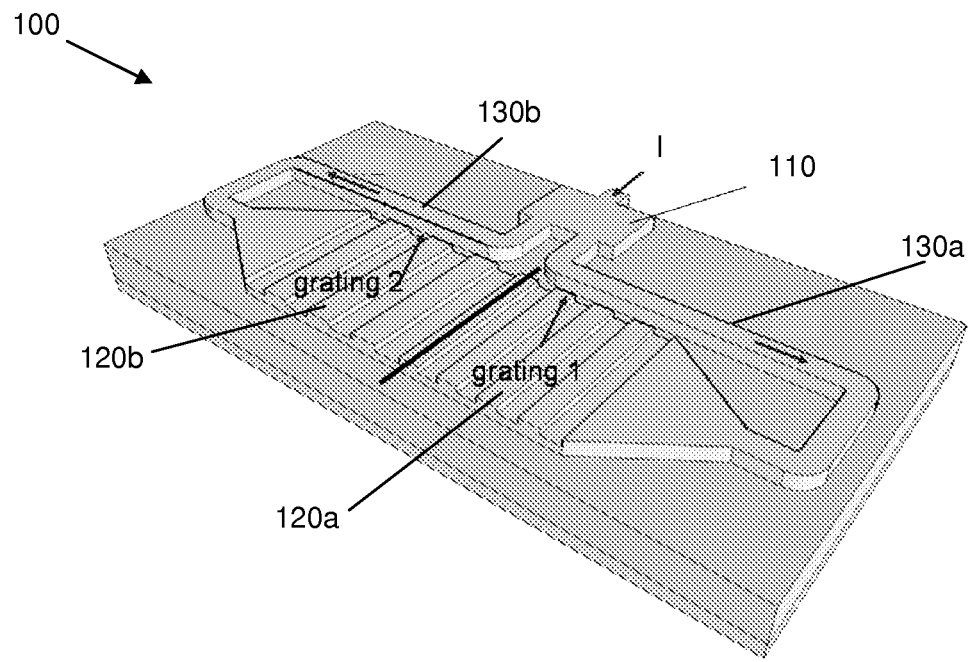
FIG. 1 illustrates a schematic representation of a two-way fed grating, according to an embodiment of the present invention.

In the following detailed description, numerous specific details are set forth in order to provide a thorough understanding of the invention and how it may be practiced in particular embodiments. However it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the steps or elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. Where reference is made to the term consists of, the latter implies that no other elements are present.

"Substantially one direction" or "substantially the same direction" may be defined for one wavelength, whereby it is known by the person skilled in the art that variation in diffraction direction may occur for different wavelengths. Where in the present invention reference is made to substantially one direction or to substantially the same direction, this encompasses for example that radiation directed under these conditions can be coupled to an optical component and excite a single mode if a monomode optical component is envisaged.

The devices and methods of the present invention are further described for the particular case of an SOI (Silicon-on-Insulator) material system. However, the devices and methods of the present invention can be based on other material systems, such as for example III-V material systems, metallic layers, low index contrast material systems such as glass or silica-based systems, or a combination thereof. Where reference is made to low refractive index materials, reference may be made to material systems wherein the difference in refractive index, e.g. between a cladding material and a core material, is limited to less than 1, e.g. to one or a few tenths of a refractive index unit.

The present invention relates to a coupler, also referred to as coupling device or grating coupler. The principle is further described for an output coupler, but the same principle can be used for an input coupler, since the structure is reciprocal if coupling between modes is considered. Embodiments according to the present invention for coupling radiation to an optical element such as e.g. a fiber, comprise a splitter for splitting a received radiation beam, e.g. received from a waveguide or a photonics circuit, into at least two radiation sub-beams. The coupler furthermore comprises at least two sub-gratings adapted for directing radiation sub-beams such that all radiation is coupled out by the coupler into substantially the same direction, e.g. to the optical element.

The sub-gratings are physically distinct sub-gratings. Whereas in the examples provided, the number of sub-gratings typically is two, the present invention is not limited thereto, and a combination of three, four, or more gratings also could be used. The number of sub-gratings and the number of sub-beams generated by the splitter typically may be the same. The coupler furthermore comprises means for guiding each of the radiation sub-beams generated in the splitter, between the splitter and the sub-gratings. Depending on the number of sub-gratings used, the coupler may be referred to as a multiple-way fed grating structure, such as for example a two-way fed grating structure. Embodiments according to the present invention thereby allow increasing the optical bandwidth of a grating coupler without large penalty in coupling efficiency. In different embodiments of the present invention, the grating coupler can comprise a one-dimensional grating or a two-dimensional grating. Selection between a one-dimensional grating or a two-dimensional grating depends on the application, e.g. depending on polarization of the radiation. As in typical applications the polarization is unknown and varying over time, the applicability of a one-dimensional grating structure might be mainly limited to cases where the polarization of the radiation is known upfront or where the polarization of the radiation should not be maintained. In addition thereto, although loss may occur, a one-dimensional grating structure being a one dimensional polarization splitting grating also is envisioned by the present invention. But advantageously, the one-dimensional grating structure can be used to optically couple an integrated light source, generating, processing or detecting light with a known and fixed polarization, in cases where a polarization maintaining fiber is used or where a polarization scrambling approach is adopted. In cases where the polarization is not known but maintenance or predetermined polarization processing is important, also a two-dimensional grating coupler structure can be used. Such a two-dimensional grating coupler may comprise two optical waveguides intersecting at a substantially right angle and a two-dimensional diffractive grating structure created at the intersection. When the diffractive grating is physically abutted with a single mode optical fiber, a polarization split is obtained that couples orthogonal waveguide. While the ratio of coupled optical power between both optical waveguides is still dependent on the polarization of the incident light, this two-dimensional fiber coupling structure can be used in a polarization diversity approach, in order to achieve a polarization independent integrated circuit.

By way of illustration, the present invention not being limited thereto, an example of a one-dimensional two-way fed grating coupler 100 is shown in FIG. 1. The splitter 110, the sub-gratings 120a, 120b as well as the guiding means 130a, 130b for guiding the radiation between the splitter 110 and the sub-gratings 120a, 120b are shown in FIG. 1.

The splitter 110 may receive the radiation with intensity I from a waveguide or directly from an optical component or circuit. The splitter may be adapted for splitting the incoming radiation beam into two or more sub-beams, the number of sub-beams created typically corresponding with the number of sub-gratings used. By way of illustration, the present invention not being limited thereto, the splitter used may be a 3 dB splitter. The splitter may be adapted to e.g. split light in a waveguide on a chip, e.g. photonic integrated circuit, into sub-beams. The splitting may be performed in substantially equal parts, although the invention is not limited thereto.

All splitted parts feed sub-gratings with smaller number of periods, typically substantially smaller than the number of periods that would be used in case of non-splitted gratings, and with smaller (splitted) initial power. The feeding is performed by guiding means 130a, 130b, which may for example be waveguides, although the invention is not limited thereto.

The sub-gratings 120a, 120b may be obtained by splitting a standard grating structure having N periods into n sub-gratings, although the sub-gratings 120a, 120b also may be formed in a different way. The n sub-gratings 120a, 120b may each have N/n periods, although the invention is not limited thereto. Advantageously, the total number of periods for all sub-gratings 120a, 120b may be equal to the number of periods that would be present if only one non-splitted grating was used, the present invention not being limited thereto. The period of the sub-gratings 120a, 120b may be adjusted so that both sub-gratings radiate into substantially the same direction (where the radiation will be captured by a fiber). Alternatively, the sub-gratings as such may direct radiation in different outcoupling directions, but in this case optical components, e.g. wedges, may be provided to one or more sub-gratings for redirecting the radiation so that outcoupling from the coupler occurs in one direction. Feeding of the sub-gratings 120a, 120b may be performed in opposite directions, or under another angle. In one example the feeding of the sub-gratings may be performed such that the angle between the different feeding directions is substantially $2\pi/n$. For the sake of convenience, the example is now further discussed with reference to a grating using 2 sub-gratings. Such a grating thus may be split into two sub-gratings with substantially N/2 periods. Both sub-gratings advantageously may be fed from opposite sides from a single source and with substantially equal phase and amplitude for the entire wavelength range involved. Using such a two-way fed grating structure, the radiation is coupled out over a distance still matching the dimensions of the fiber mode (N/2+N/2=N periods). Since both sub-gratings 120a, 120b may have substantially N/2 periods instead of N and since they are excited with equal phase for the entire wavelength range involved, the optical bandwidth of the coupling to the optical element is higher as compared to a standard grating with N periods. It will be obvious to the person skilled in the art that the relative bandwidth of the diffraction by a grating of an electromagnetic mode to another electromagnetic mode scales inversely proportional to the number of grating periods (for non-zero diffraction orders). Both sub-gratings 120a, 120b may radiate into substantially the same direction, where the radiation can be captured by the fiber.

Figure 2:
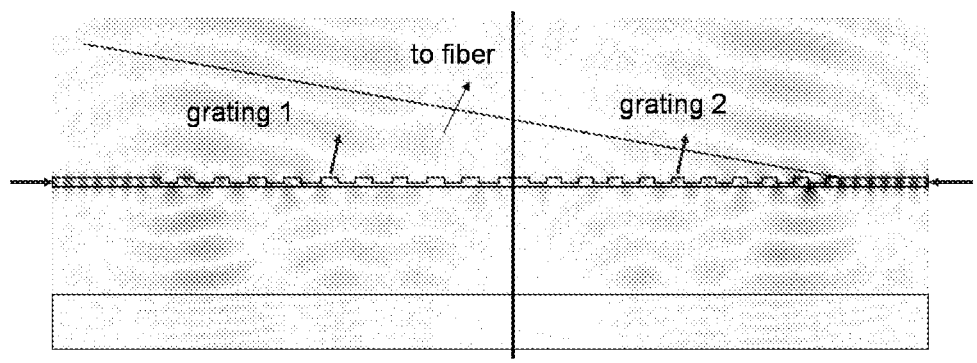
FIG. 2 shows a field profile of a two-way fed grating, as can be obtained in an embodiment of the present invention.
Figure 3:
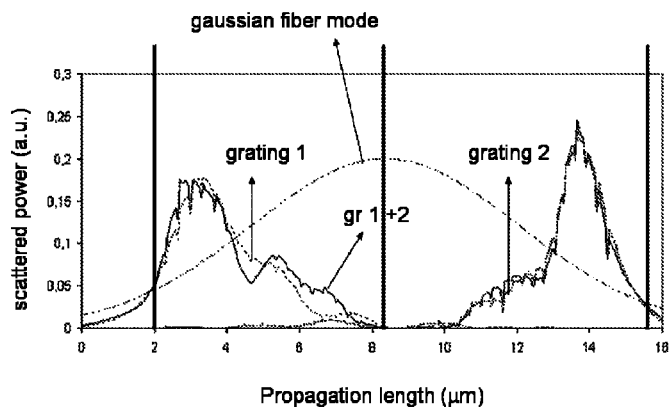
FIG. 3 illustrates the scattered power profile of radiation for coupling using a two-way fed grating without leakage between both sub-gratings, as can be obtained in an embodiment according to the present invention.
Figure 4:
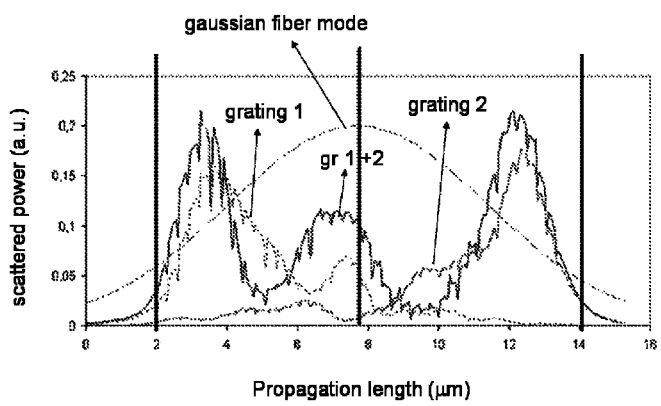
FIG. 4 illustrates the scattered power profile of radiation for coupling using a two-way fed grating with leakage between both sub-gratings, as can be obtained in an embodiment according to the present invention.

A field profile of a grating structure as shown in FIG. 1, excited from both sides, is shown in FIG. 2. For good coupling efficiency, it is preferred to have an optimal phase relation between the different excitations for the entire wavelength range involved. It is even more preferred that all arms are substantially symmetric so that all sub-gratings are excited with a wavelength independent phase difference. Depending on the application, the grating coupler parameters can be chosen differently. The outcoupling direction may typically be substantially different than the surface normal direction, e.g. between 75-105 degrees. One possibility is to choose the grating strength such that no power leaks between the sub-gratings, e.g. from sub-grating 120a to sub-grating 120b and vice versa. However, in that case the scattered power is zero at the central position of the outcoupling direction, e.g. where the fiber mode has its maximum, resulting in a poor overlap with the fiber mode, as shown in FIG. 3. Another possibility is selecting a lower grating strength, allowing radiation leaking between the sub-gratings, e.g. from sub-grating 120a to sub-grating 120b and vice versa. In this case, constructive interference gives rise to a local maximum in the combined curve (sub-grating 120a+sub-grating 120b), increasing the overlap with the fiber mode. This is illustrated in FIG. 4 for a non-optimised grating structure (e.g. oxide layer 2 micron). For the two-way fed grating structure of this example, the calculated coupling efficiency is 36% and the 1 dB bandwidth is 70 nm. A uniform grating with increased coupling strength (e.g. to make it shorter to increase the bandwidth) has a calculated coupling efficiency of 37% and an optical bandwidth of 55 nm. It thus can be appreciated that the bandwidth can be significantly increased, while substantially maintaining the coupling efficiency. More generally, the grating strength can be selected such that either leakage between sub-gratings occurs or substantially no leakage between sub-gratings occurs.

Figure 5:
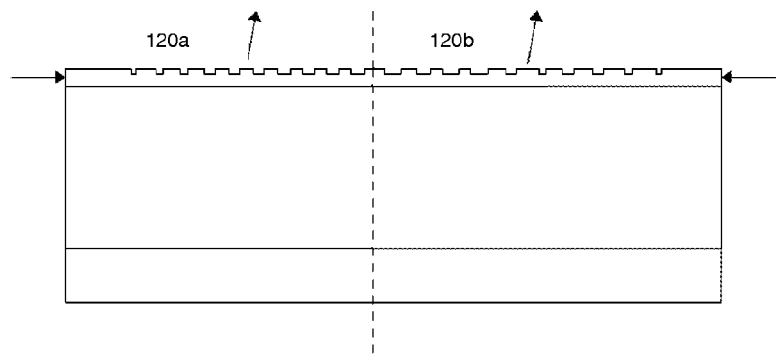
FIG. 5 illustrates an example of a two-way fed grating with apodized sub-gratings, according to an embodiment of the present invention.

A further optimization of the two-way fed grating structure comprises apodization of both sub-gratings 120a, 120b (i.e. making the sub-gratings non-uniform in pitch and/or fill factor), in order to maximize the overlap with a substantial Gaussian fiber mode for coupling to or from an optical fiber such that it is in optical communication with the grating. This results in optimized scatter profiles, and the coupling efficiency is increased. Apodization can be obtained in a number of ways, by varying the pitch and/or fill factor of the grating. An example of an apodized sub-grating might be a sub-grating for which the coupling coefficient α, determined by the pitch and/or fillfactor, depends on the location and is substantially given by the relation:

$$2\alpha(z) = \frac{G^2(z)}{1 - \int_0^z G^2(t)dt}$$

with G(z) a semi-Gaussian function, representing the half of the substantially Gaussian fiber mode. An example of a two-way fed 1D grating with apodized grating can be found in FIG. 5. It can be seen that the pitch in both sub-gratings is adapted.

Figure 6:
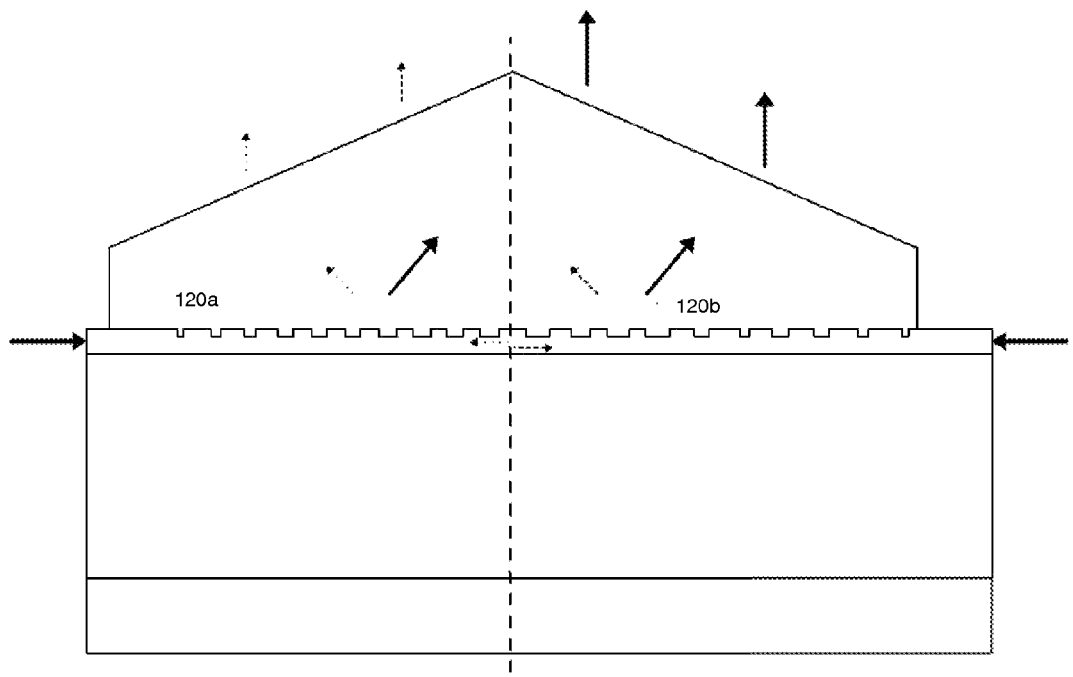
FIG. 6 illustrates an example of a two-way fed grating with wedge, according to an embodiment of the present invention.
Figure 7:
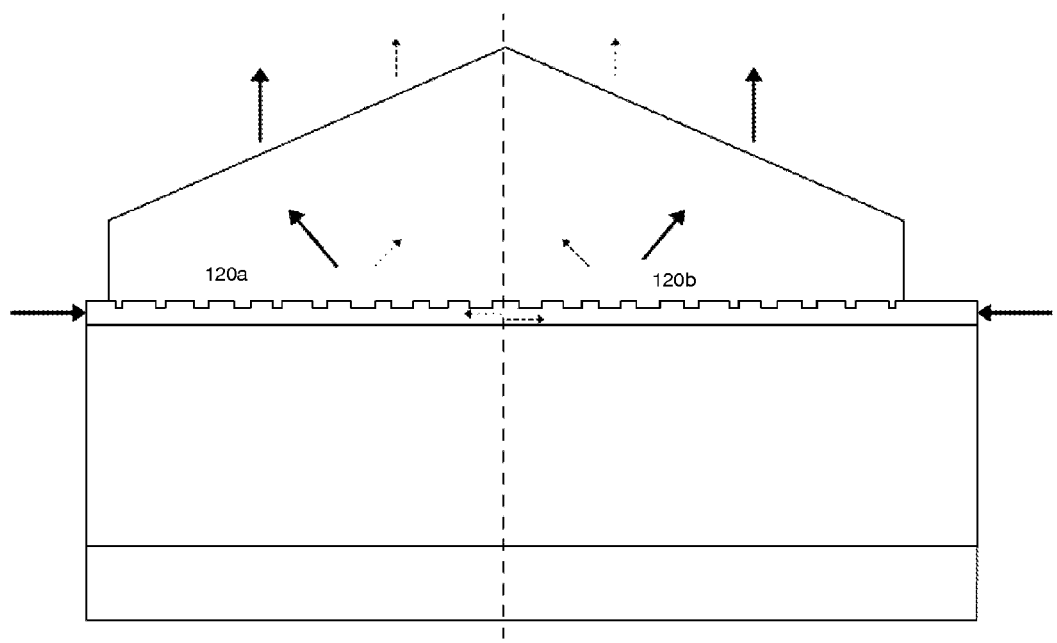
FIG. 7 illustrates an example of a two-dimensional two-way fed grating, according to an embodiment of the present invention.

A further optimization of the two-way fed grating structures comprises incorporation of a wedge on top of the grating, in order to diffract radiation that leaks from the sub-grating 120a to sub-grating 120b or vice versa to the fiber. This is illustrated in FIG. 6 and FIG. 7. FIG. 6 illustrates use of a wedge on a coupler having two sub-gratings 120a, 120b, whereby for each sub-grating, the incoming sub-beam is partially directed perpendicular to the plane of the sub-grating and partially directed to a neighbouring area where it is, due to the presence of a suitable wedge, also directed perpendicular to the plane of the sub-grating, present in that area. FIG. 7 illustrates an alternative coupler, whereby the gratings are selected to have a different apodization, but whereby the resulting effect is similar, i.e. radiation directed outside an area of outcoupling for one sub-grating is recuperated using a suitable wedge in an area of outcoupling for another sub-grating. The use of wedges, as e.g. shown in FIG. 6 and FIG. 7, is such that both direct radiation and leaking radiation is redirected in the appropriate direction.

Figure 8:
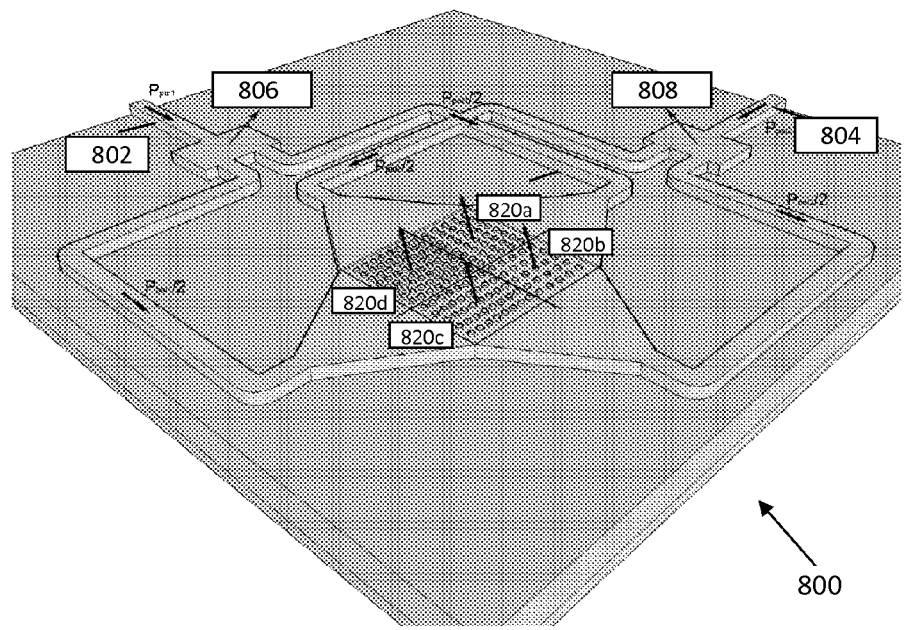
FIG. 8 illustrates an example of a two-dimensional two-way fed grating with apodized sub-gratings, according to an embodiment of the present invention.
Figure 9:
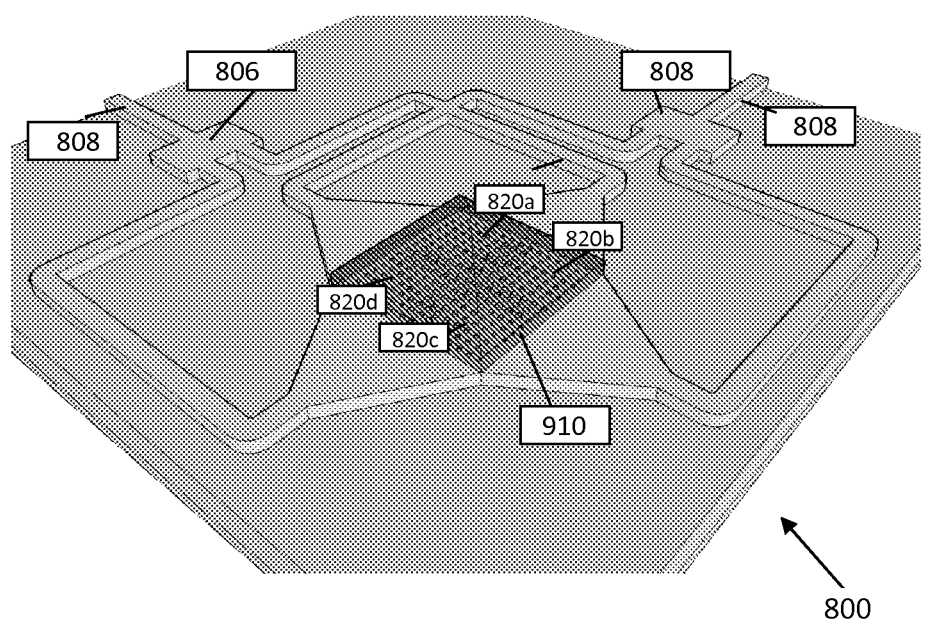
FIG. 9 illustrates an example of a two-dimensional two-way fed grating with wedge, according to an embodiment of the present invention.

In some embodiments of the present invention, the coupler comprises a 2 dimensional grating. The example is shown of a two-way feeding grating, in the current example based on a standard grating structure having N1 periods in one direction and N2 periods in another direction and split into four 2D sub-gratings with respectively substantially N1/2 periods in one direction and substantially N2/2 periods in the second direction, although the invention is not limited thereto. This is illustrated in FIG. 8. The grating structure according to the present example is an outcoupling grating structure 800 fed from two optical waveguides intersecting at the substantially right angle at the grating structure. The periods of the sub-gratings in the present example are adjusted so that all sub-gratings radiate into substantially the same direction (where the light will be captured by a fiber). Using such a two-way fed grating structure, the light is coupled out over a distance still matching the dimensions of the fiber mode. Since both gratings have in both directions substantially Nx/2 periods instead of Nx, the optical bandwidth is higher as compared to a standard grating with N periods. As illustrated in the example shown in FIG. 8, the light in two waveguides 802, 804 on a chip, e.g. photonic integrated circuit, is split in two substantially identical parts by splitters 806, 808, in the present example being 3 dB splitters. All 4 parts feed sub-gratings 820a, 820b, 820c, 820d with half of the initial power. The sub-gratings according to the present example radiate into substantially the same direction, where the light can be captured by the fiber. In alternative embodiments, the redirecting by the sub-gratings may be such that, in combination with other optical elements, the radiation is coupled out from the coupler in substantially the same direction. For good coupling efficiency, it is preferred to have an optimal phase relation between both excitations. Depending on the application, the grating coupler parameters can be chosen differently. One possibility is choosing the grating strength such that no substantial power leaks from a sub-grating region to another sub-grating region and vice versa. However, in that case the scattered power is zero at the position where the fiber mode has its maximum, resulting in a poor overlap with the fiber mode. Another possibility is selecting a lower grating strength, allowing light leaking substantially from a sub-grating region to another sub-grating region and vice versa. In this case, constructive interference gives rise to a local maximum in the combined mode profile, increasing the overlap with the fiber mode. A further optimization of the two-way fed grating structure comprises apodization of the sub-gratings (i.e. making the sub-gratings non-uniform), in order to maximize the overlap with the Gaussian fiber mode. This results in optimized scatter profiles, and the coupling efficiency is increased. An example of a two-way fed 2D grating with apodized grating and with additional wedge can be found in FIG. 9. The two-way fed grating structure incorporates a wedge 910 on top of the sub-gratings, in order to diffract light that leaks substantially from a sub-grating to another sub-grating to the same outcoupling direction. Furthermore, also the radiation stemming from the sub-grating in that area may be redirected by a wedge.

In one aspect, the present invention also relates to a method for coupling radiation. The method comprises splitting a received radiation beam in at least two radiation sub-beams. Such splitting may be in radiation beams having substantially equal power or different power. The method also comprises guiding each of the generated radiation sub-beams, generated by the splitting, towards the distinct sub-gratings. Such guiding may be performed in waveguides. The guiding may be performed such that the angular spacing between different feeding directions for feeding the radiation in the distinct sub-gratings is uniform, although embodiments of the invention are not limited thereto. The method furthermore comprises directing all sub-beams such that outcoupling by the coupler is performed in substantially the same direction, e.g. to couple the radiation into a single optical element, e.g. a fiber. Directing of the sub-beams may be performed for each sub-beam using a grating having a period substantially smaller than the period of a grating that typically would be used when directing the full radiation beam using a single grating. Alternatively to the above described method, the method may comprise receiving a single radiation beam on a set of sub-gratings, each sub-grating directing a radiation sub-beam being part of the radiation beam into a different direction, guiding the different radiation sub-beams to a combiner, and combining the different sub-beams to a single combined radiation beam. Other steps in the methods described above may be steps corresponding with the functionality provided by the components discussed in the first aspect of the present invention. One example thereof may be redirecting of radiation using a wedge on top of the sub-grating structures.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims.

The invention claimed is:

1. A coupler for use in coupling a radiation beam from a planar waveguide circuit into an optical element external to the planar waveguide circuit, the coupler comprising:
   an input waveguide formed in the planar waveguide circuit for transmitting the radiation beam;
   a splitter formed in the planar waveguide circuit having a first input port coupled to the input waveguide; and at least two sub-beam output ports, the splitter being configured to split the radiation beam transmitted by the input waveguide into at least two distinct radiation sub-beams, each outputted from the splitter at a different output port;
   at least two distinct sub-beam waveguides formed in the planar waveguide circuit, each sub-beam waveguide having an input end and an output end, the input end of each sub-beam waveguide being coupled to one of the output ports of the splitter; and
   at least two distinct sub-gratings formed on the planar waveguide circuit, the output end of each sub-beam waveguide being coupled to a distinct one of the sub-gratings, thereby coupling the respective output port of the splitter to the distinct one of the sub-gratings;
   wherein each of the distinct sub-gratings is adapted to couple radiation from its respective sub-beam waveguide out of the planar waveguide circuit at a surface thereof, such that all radiation coupled between the input waveguide and the optical element is coupled from the sub-gratings in substantially one direction.

2. The coupler according to claim 1, in combination with the optical element, wherein the optical element is disposed such that each sub-grating is substantially optically coupled to the optical element.

3. The coupler according to claim 1, wherein the coupler is a one dimensional grating coupler.

4. The coupler according to claim 1, wherein the coupler is a two dimensional grating coupler.

5. The coupler according to claim 1, wherein the number of sub-gratings is two.

6. The coupler according to claim 1, wherein the number of sub-gratings is four.

7. The coupler according to claim 1, wherein each sub-grating and the sub-beam waveguide coupled thereto are arranged such that the angle between the directions of coupling of the sub-beam waveguide to the sub-grating for adjacent sub-gratings is substantially $2\pi/n$, n being the number of sub-gratings.

8. The coupler according to claim 1, wherein the sum of the number of periods of the sub-gratings is adapted to match the size of the optical element.

9. The coupler according to claim 1, wherein the grating strength of the coupler is adapted such that substantially no leakage between sub-gratings occurs.

10. The coupler according to claim 1, wherein the grating strength of the coupler is adapted such that leakage between sub-gratings occurs.

11. The coupler according to claim 10, the optical element being an optical fiber, wherein at least one of the sub-gratings is apodized to maximize the overlap with a Gaussian fiber mode for the optical fiber.

12. The coupler according to claim 10, the optical element being an optical fiber, wherein a wedge is provided on the planar waveguide on top of the grating, in order to refract to the optical fiber light that leaks from one sub-grating to another.

13. A coupler according to claim 1, wherein the sub-gratings are adapted to couple all sub-beams out of the planar waveguide circuit into substantially the same direction.

14. A coupler according to claim 1, wherein for one or more of the sub-gratings an additional wedge is provided for redirecting the sub-beam such that the coupling directions for each of the sub-gratings is substantially the same.

15. A method for coupling radiation out of a planar waveguide circuit at a surface thereof, the method comprising
   splitting a received radiation beam in the planar waveguide circuit in at least two radiation sub-beams each propagating in the planar waveguide circuit;
   guiding each of the generated radiation sub-beams in the planar waveguide circuit towards a distinct sub-grating formed on the planar waveguide circuit; and
   coupling each of the radiation sub-beams out of the planar waveguide circuit at a surface thereof through its respective sub-grating directing all sub-beams by the distinct sub-gratings such that outcoupling of the radiation from the planar waveguide circuit occurs in substantially one direction.

16. A method for coupling radiation into a planar waveguide circuit at a surface thereof, the method comprising
   directing a plurality of distinct radiation sub-beams of a single radiation beam to a plurality of distinct sub-gratings formed on the planar waveguide circuit at a surface thereof;
   coupling each of the radiation sub-beams into the planar waveguide through its respective sub-grating, each of the radiation sub-beams being coupled into a different direction in the planar waveguide;
   guiding the different radiation sub-beams in the planar waveguide circuit to a combiner formed in the planar waveguide circuit; and
   combining the different sub-beams to a single combined radiation beam guided in the planar waveguide circuit.

17. A coupler for use in coupling a radiation beam from an optical element external to a planar waveguide circuit into the planar waveguide circuit, the coupler comprising:
   at least two distinct sub-gratings formed on the planar waveguide circuit, each sub-grating being adapted to receive radiation from the optical element and couple it into the planar waveguide circuit, each of the distinct sub-gratings being adapted such that all radiation coupled from the optical element received by the sub-gratings from substantially one direction;
   at least two distinct sub-beam waveguides formed in the planar waveguide circuit, each sub-beam waveguide having an input end and an output end, the input end of each sub-beam waveguide being coupled to a distinct one of the sub-gratings, each of the distinct sub-gratings being adapted to couple radiation from the optical element into its respective sub-beam waveguide as a radiation sub-beam;
   a combiner formed in the planar waveguide circuit, the combiner having a first output port; and at least two sub-beam input ports, each coupled to an output end of a distinct one of the sub-beam waveguides, thereby coupling the respective input port of the combiner to the distinct one of the sub-gratings, the combiner being configured to combine the radiation sub-beams transmitted by the sub-beam waveguides into a radiation beam outputted at the first output port.

18. The coupler according to claim 17, in combination with the optical element, wherein the optical element is disposed such that each sub-grating is substantially optically coupled to the optical element.

19. The coupler according to claim 17, wherein each sub-grating and the sub-beam waveguide coupled thereto are arranged such that the angle between the directions of coupling of the sub-beam waveguide to the sub-grating for adjacent sub-gratings is substantially $2\pi/n$, n being the number of sub-gratings.

20. The coupler according to claim 18, wherein the optical element is an optical fiber.

21. The coupler according to claim 2, wherein the optical element is an optical fiber.

* * * * *

UNITED STATES PATENT AND TRADEMARK OFFICE
CERTIFICATE OF CORRECTION

PATENT NO. : 8,699,837 B2  
APPLICATION NO. : 13/000832  
DATED : April 15, 2014  
INVENTOR(S) : Baets et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 325 days.

Signed and Sealed this

Twenty-ninth Day of September, 2015

Michelle K. Lee
*Director of the United States Patent and Trademark Office*